(12) United States Patent (10) Patent No.: US 8,842,194 B2
Miyahara (45) Date of Patent: Sep. 23, 2014

(54) IMAGING ELEMENT AND IMAGING APPARATUS

(75) Inventor: Hiroyuki Miyahara, Kanagawa (JP)

(73) Assignee: Panasonic Corporation, Osaka (JP)

( * ) Notice: Subject to any disclaimer, the term of this patent is extended or adjusted under 35 U.S.C. 154(b) by 13 days.

(21) Appl. No.: 13/592,453

(22) Filed: Aug. 23, 2012

(65) Prior Publication Data

US 2013/0057724 A1 Mar. 7, 2013

(30) Foreign Application Priority Data

Aug. 26, 2011 (JP) ................................. 2011-184413

(51) Int. Cl.
*H04N 9/73* (2006.01)
*H04N 5/335* (2011.01)
*H04N 9/04* (2006.01)

(52) U.S. Cl.
CPC ..................................... *H04N 9/045* (2013.01)
USPC ...................... 348/223.1; 348/273; 348/224.1

(58) Field of Classification Search
USPC .................... 348/223.1, 273, 224.1
See application file for complete search history.

(56) References Cited

U.S. PATENT DOCUMENTS

| 7,864,235 | B2 | 1/2011 | Abe |
| 2006/0012808 | A1 | 1/2006 | Mizukura et al. |
| 2006/0222324 | A1 | 10/2006 | Abe |
| 2010/0060446 | A1* | 3/2010 | Ognibene ..................... 340/471 |

FOREIGN PATENT DOCUMENTS

| JP | 2000-196952 | 7/2000 |
| JP | 2003-284084 | 10/2003 |
| JP | 2005-175893 | 6/2005 |
| JP | 2006-13567 | 1/2006 |
| JP | 2006-279389 | 10/2006 |
| JP | 2006-311524 | 11/2006 |

* cited by examiner

*Primary Examiner* — Twyler Haskins
*Assistant Examiner* — Quang Le
(74) *Attorney, Agent, or Firm* — Wenderoth, Lind & Ponack, L.L.P.

(57) ABSTRACT

An imaging element includes a red color filter, a blue color filter, and two kinds of first and second green color filters. The first green color filter has a peak spectral sensitivity in a longer wavelength region than a wavelength of a peak spectral sensitivity of the second green color filter.

6 Claims, 11 Drawing Sheets

BRIGHTNESS SIGNAL GENERATION FLOW
(FIRST EMBODIMENT)

US 8,842,194 B2

IMAGING ELEMENT AND IMAGING APPARATUS

BACKGROUND

1. Technical Field

The present disclosure relates to an imaging element having a plurality of kinds of color filters, and an imaging apparatus provided with the imaging element.

2. Related Art

JP2000-196952A discloses an imaging apparatus. This imaging apparatus can control a shot image according to adaptation to luminosity. That is, the imaging apparatus controls the shot image to increase a blue color sensitivity increases as the image becomes dark, and increase a red color sensitivity as the image becomes bright.

Thus, the imaging apparatus can shoot an image applied with adaptation to luminosity similar to that of a human eye.

SUMMARY

The imaging apparatus disclosed in JP2000-196952A may be able to sufficiently control a blue component and a red component according to a brightness level of the captured image. However, the imaging apparatus disclosed in JP2000-196952A cannot sufficiently control a green component according to the brightness level of the shot image.

It is an object of the present disclosure to provide an imaging element and an imaging apparatus capable of sufficiently controlling a green component according to a brightness level of a captured image.

An imaging element of present disclosure is an imaging element for generating an image signal based on the incident light, comprising a red color filter; a blue color filter; and two kinds of first and second green color filters.

The first green color filter has a spectral sensitivity peak in a wavelength region higher than the wavelength of a spectral sensitivity peak of the second green color filter.

An imaging apparatus of present disclosure includes the imaging element in the above and a controller that corrects image signals generated by the imaging element according to the illumination level of a subject and generating brightness signals.

The imaging element and the imaging apparatus in the above aspects can sufficiently control the green component according to the brightness level of the captured image.

DETAILED DESCRIPTION OF PREFERRED EMBODIMENTS

Referring to the accompanying drawings appropriately, the embodiments will be described in detail below. However, some detailed description thereof will be omitted more than necessary. For example, a detailed description of well-known matters and a duplicate description for the configuration of substantially the same matter may be omitted. This is to avoid causing description to be unnecessarily verbose, and to facilitate the understanding of those skilled in the art. It should be noted that the inventor provide accompanying drawings and the following description in order to cause those skilled in the art to fully understood the present disclosure. It is not intended to limit the subject matter of the claims by those.

Hereinafter, an embodiment will be described with a digital video camera (imaging apparatus) provided with a CMOS image sensor (imaging element) as one example, with reference to the drawings.

1. First Embodiment

1-1. Configuration of Digital Video Camera (Imaging Apparatus)

Figure 1:
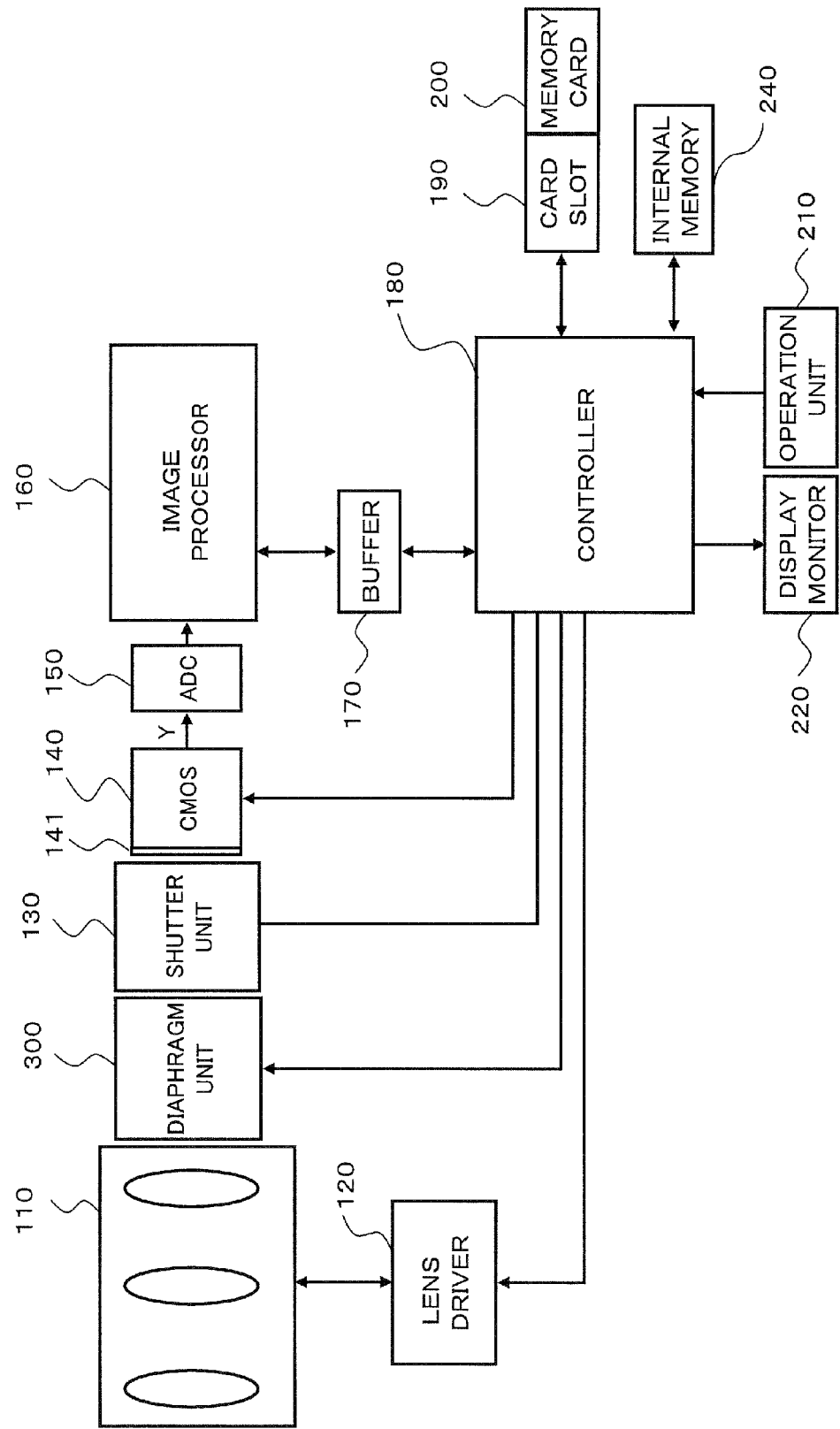
FIG. 1 is a view showing a configuration of a digital video camera according to a first embodiment.

First, an example of an electrical configuration of a digital video camera according to a first embodiment will be described with reference to FIG. 1. FIG. 1 is a block diagram showing a configuration of a digital video camera 100. The digital video camera 100 is an imaging apparatus which captures an image of a subject image formed by an optical system 110 including one or more lenses with a CMOS image sensor 140.

Image data generated by the CMOS image sensor 140 is subjected to various processes by an image processor 160, and is stored in a memory card 200. The configuration of the digital video camera 100 will be described in detail below.

The optical system 110 includes a zoom lens and a focus lens. By moving the zoom lens along an optical axis, the subject image can be enlarged or reduced. In addition, by moving the focus lens along the optical axis, a focus of the subject image can be adjusted.

A lens driver 120 drives various kinds of lenses included in the optical system 110. The lens driver 120 includes a zoom motor for driving the zoom lens, and a focus motor for driving the focus lens.

A diaphragm unit 300 adjusts a size of an aperture for light, according to settings by a user or automatically, to adjust an amount of light to be transmitted.

A shutter unit 130 is a unit for blocking the light to be transmitted to the CMOS image sensor 140.

The CMOS image sensor 140 captures the subject image formed by the optical system 110, to generate image data. The CMOS image sensor 140 includes a color filter 141 (it will be described in detail later), a photo detector, and an AGC (gain control amplifier). The photo detector converts an optical signal collected by the interchangeable lens 101 to an electrical signal to generate image information. The AGC (gain control amplifier) amplifies the electrical signal that is output from the photo detector. The CMOS image sensor 140 further includes a driving circuit to perform various kinds of operations such as exposure, transfer, and electrical shutter. A detail thereof will be described later.

An A/D converter 150 converts analog image data generated by the CMOS image sensor 140 to digital image data.

The image processor 160 performs various processes for the digital image data which is generated and converted by the CMOS image sensor 140, under control of a controller 180. The image processor 160 generates image data to be displayed on a display monitor 220, and generates image data to be stored in the memory card 200. For example, the image processor 160 performs various processes such as a gamma correction, white balance correction, and defect correction for the image data generated by the CMOS image sensor 140. In addition, the image processor 160 compresses the image data generated by the CMOS image sensor 140 according to a compression format compliant with H.264 standard, MPEG 2 standard, or the like. The image processor 160 can be implemented by a DSP or a microcomputer.

The controller 180 is a controlling unit for controlling a whole digital video camera 100. The controller 180 can be implemented by a semiconductor element. The controller 180 may be configured only by hardware, or may be implemented by combination of hardware and software. The controller 180 can be implemented by a microcomputer.

A buffer 170 functions as a work memory of the image processor 160 and the controller 180. The buffer 170 can be implemented with a DRAM or a ferroelectric memory.

A card slot 190 is a slot which a memory card 200 can be inserted into and removed from. The memory card 200 can be mechanically and electrically connected to the card slot 190.

The memory card 200 includes therein a flash memory or the ferroelectric memory, and can store data such as an image file generated by the image processor 160.

An internal memory 240 is configured by the flash memory or the ferroelectric memory. The internal memory 240 stores a control program or the like used for controlling the whole digital video camera 100.

An operation unit 210 is a general term for a user interface which receives an operation from a user. The operation unit 210 includes, for example, arrow keys and a decision button through which the operation from the user can be received.

A display monitor 220 can display an image (through image) represented by an image data generated by the CMOS image sensor 140, and an image of image data read from the memory card 200. In addition, the display monitor 220 can display various kinds of menu screens used for configuring various kinds of settings on the digital video camera 100.

1-2. Configuration of CMOS Image Sensor

Figure 2:
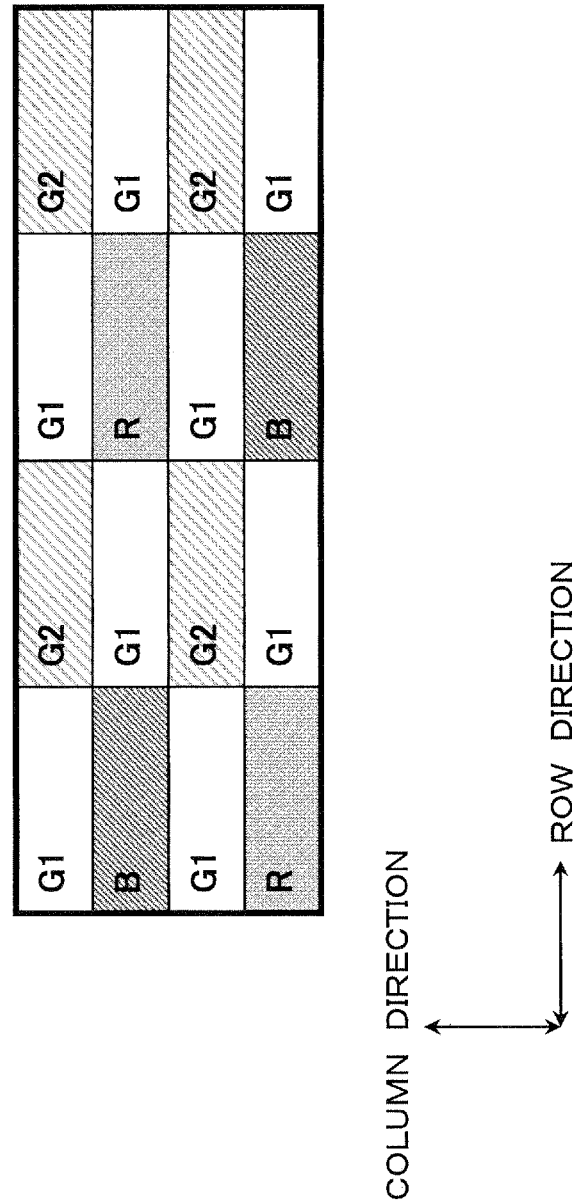
FIG. 2 is a plan view showing an arrangement of color filters according to the first embodiment.
Figure 3:
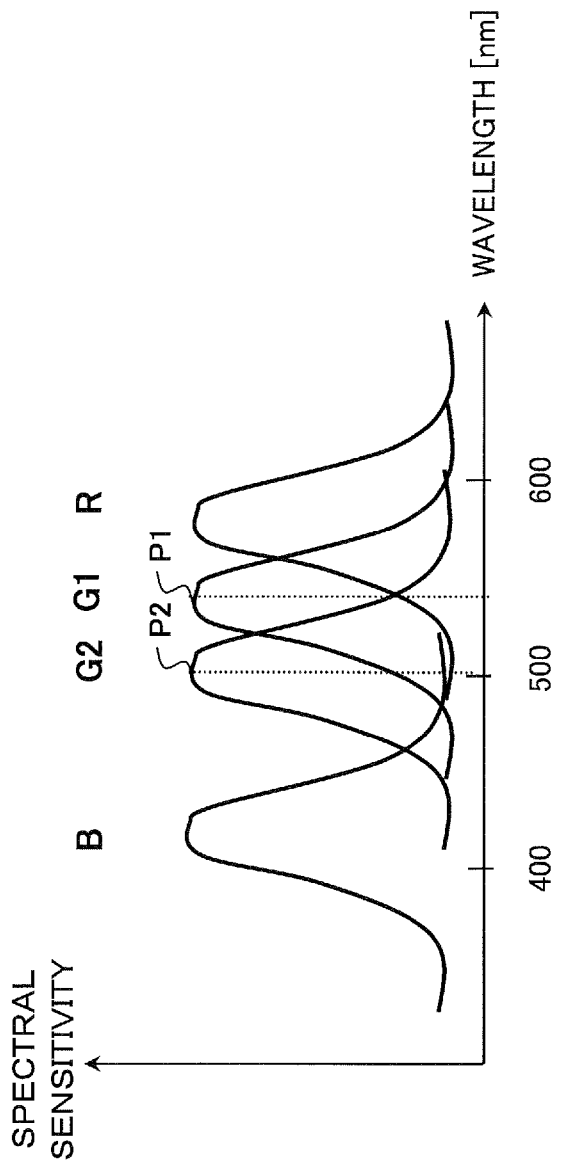
FIG. 3 is a view showing spectral sensitivity of each of color filters of a CMOS image sensor according to the first embodiment.
Figure 11:
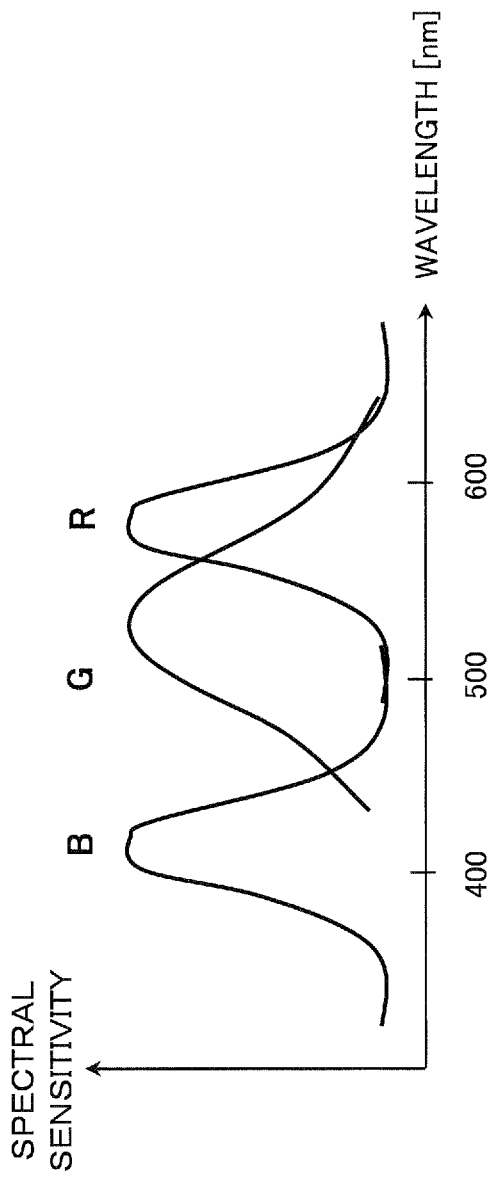
FIG. 11 is a view showing spectral sensitivity of color filters according to a comparison example.

Next, a configuration of the CMOS image sensor according to the first embodiment will be described with reference to FIGS. 2, 3, and 11. FIG. 2 is a plan view showing a color filter 141 provided in the CMOS image sensor 140. FIG. 3 is a schematic view for describing spectral sensitivity of each of color filters used in the CMOS image sensor 140. FIG. 11 is a schematic view for describing spectral sensitivity of color filters of a comparison example, and explains a reason why the color filters having the spectral sensitivity shown in FIG. 3 are used.

As shown in FIG. 2, the CMOS image sensor in this example has four kinds of color filters arranged in a matrix shape along a row direction and a column direction. Specifically, the CMOS image sensor 140 has two kinds of green color filters (G1 and G2), one kind of red color filter (R), and one kind of blue color filter (B).

The two kinds of green color filters of different spectral sensitivity (G1 and G2) are arranged in a checkered pattern in the row direction and column direction in the CMOS image sensor 140. In addition, the two kinds of green color filters of different spectral sensitivity (G1 and G2) are arranged complementarily with respect to each other in the row direction and the column direction in the CMOS image sensor 140.

The red and blue color filters (R and B) are arranged complementarily with respect to the green color filter (G1) in the row direction and column direction in the CMOS image sensor 140. In addition, an arrangement order of the red and blue color filters (R and B) in the row direction is reversed with respect to each column in which they are arranged.

Although not illustrated herein, light which passed through each color filter is converted to predetermined image data by the driving circuit including a photodiode. In addition, a microlens or the like used for collecting the light is arranged on each color filter.

Spectral Sensitivity of Color Filter

First Embodiment

Here, the spectral sensitivity of each color filter is as shown in FIG. 3. More specifically, the blue color filter (B) has a peak (maximum value) of the spectral sensitivity in a neighborhood of a short wavelength of 400 nm. The red color filter (R) has a peak (maximum value) of the spectral sensitivity in a neighborhood of a long wavelength of 600 nm. The one color filter (G1) of the two kinds of green color filters with different spectral sensitivity has a peak (maximum value) P1 of the spectral sensitivity in a neighborhood of 550 nm. The other color filter (G2) of the two kinds of green color filters of different spectral sensitivity has a peak (maximum value) P2 of the spectral sensitivity in a neighborhood of 500 nm. Although in this embodiment, the peak of the spectral sensitivity of the one color filter (G1) is set to 550 nm, it may be set to a value shifted from 550 nm in the range of ±20 nm. In addition, although the peak spectral sensitivity of the other color filter (G2) is set to 500 nm, it may be set to a value shifted from 500 nm in the range of ±20 nm.

Here, the wavelengths 500 nm and 550 nm corresponding to the peaks P1 and P2 of the spectral sensitivity of the two kinds of green color filters with different spectral sensitivity (G1 and G2), respectively are wavelengths selected according to the characteristic of spectral luminous efficiency of a human eye. That is, the human eye recognizes an object by working a rod cell which mainly recognizes light in the neighborhood of 500 nm in a dark place (spectral luminous efficiency in dark place). In addition, the human eye recognizes an object by working a cone cell which mainly recognizes light in the neighborhood of 550 nm in a bright place (spectral luminous efficiency in bright place).

Thus, according to the first embodiment, as described above, at least the two kinds of green color filters with different spectral sensitivity (G1 and G2) corresponding to the characteristic of spectral luminous efficiency of a human eye are arranged in the CMOS image sensor 140. Then, by adjusting a weighting degree of the light received through each color filter, according to the brightness of the object (that is, the brightness of the periphery of the digital video camera), the image likely to be recognized by the human eye can be captured.

As described above, the green color filters (G1) are arranged in the checkered pattern in the CMOS image sensor 140, so that a resolution of a brightness signal of the captured image can be prevented from reducing.

The green color filter (G2) is arranged complementarily with respect the other green color filter (G1) in the CMOS image sensor 140. Thus, even when illuminance of the object is low, the sensitivity can be kept at a certain level or more.

In addition, the red color filter (R) and the blue color filter (B) are arranged in reverse with respect to each column. In other words, the arrangement of the red and blue color filters (R and B) in the row direction is reversed with respect to each column in which they are arranged. With this arrangement, moire is prevented from being generated in the captured image.

As described above, according to the first embodiment, one kind of green color filter (G) having spectral sensitivity including the wavelength of 500 nm and the wavelength of 550 nm is not used. The two kinds of green color filters (G1 and G2) having the peak of the spectral sensitivity on the wavelength of 500 nm and the wavelength of 550 nm, respectively are intentionally used.

Spectral Sensitivity of Color Filter

Comparison Example

Meanwhile, according to the comparison example, one kind of green color filter (G) having spectral sensitivity including the wavelength of 550 nm is used. The spectral sensitivity of each color filter in this comparison example is as shown in FIG. 11. As shown in FIG. 11, in the comparison example, one kind of green color filter (G) having a peak in the vicinity of 550 nm must be used to configure the illuminance. Therefore, it is possible to follow the characteristic of spectral luminous efficiency of a human eye in the bright place, but it is impossible to follow the characteristic of spectral luminous efficiency of a human eye in the dark place. In addition, even if the peak of the spectral sensitivity is set in the vicinity of 500 nm, it is possible to follow the characteristic of spectral luminous efficiency of a human eye in the bright place, on the other hand, it is impossible to follow in the dark place.

1-3. Operation for Generating Brightness Signal (Y) from Captured Image

Figure 4:
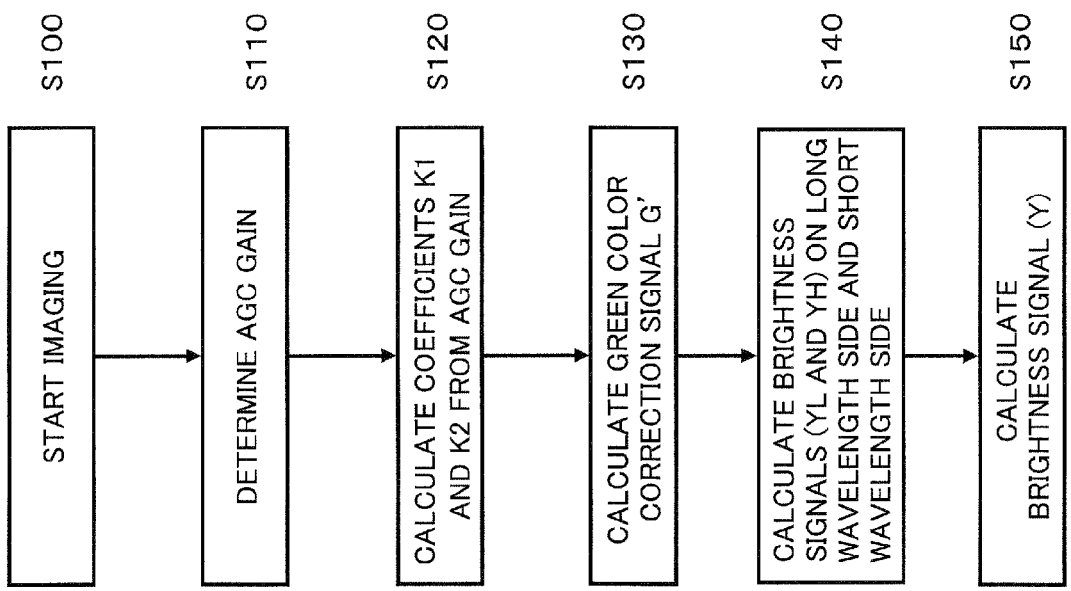
FIG. 4 is a flowchart for describing an operation for generating a brightness signal from a captured image according to the first embodiment.
Figure 5:
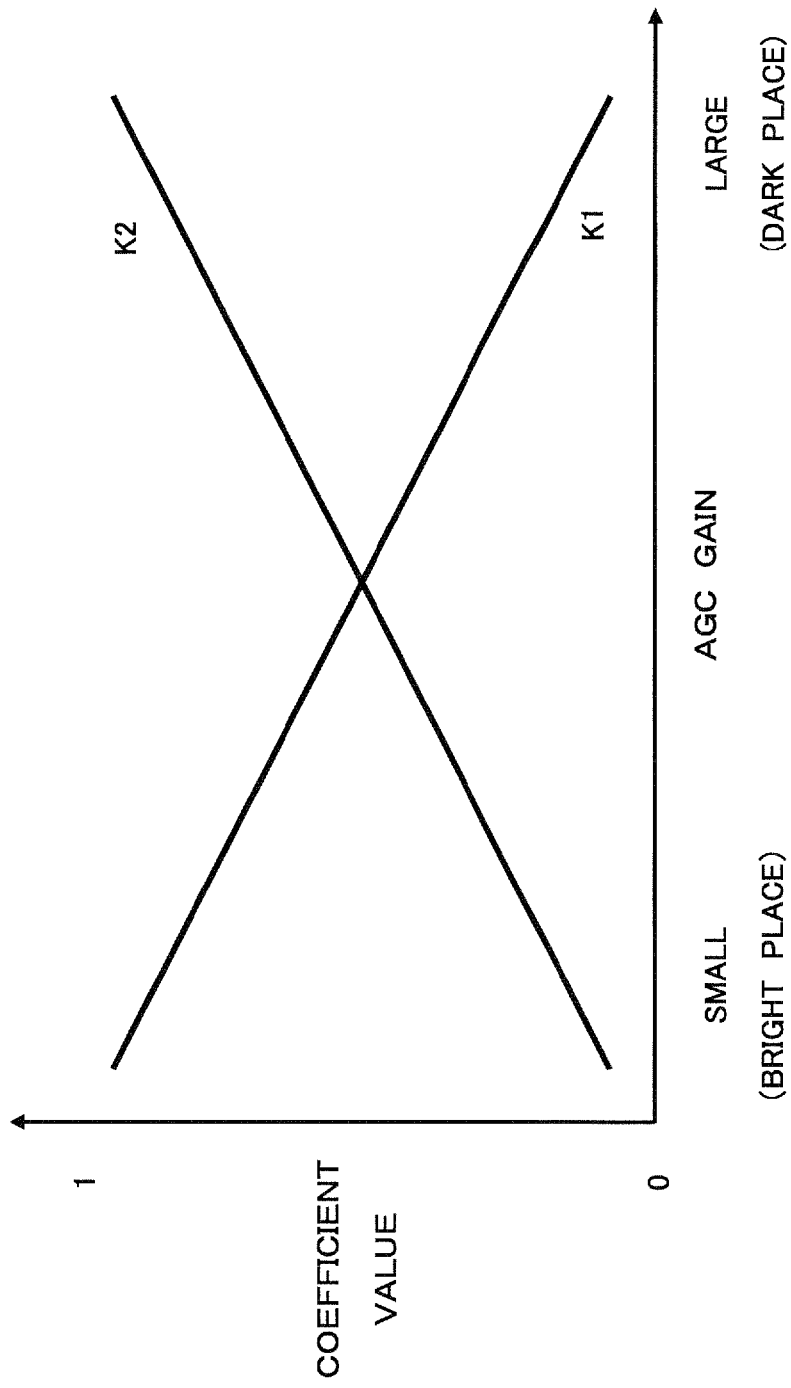
FIG. 5 is a view showing a relationship to calculate a coefficient for obtaining a correction signal for a green color according to the first embodiment.
Figure 6:
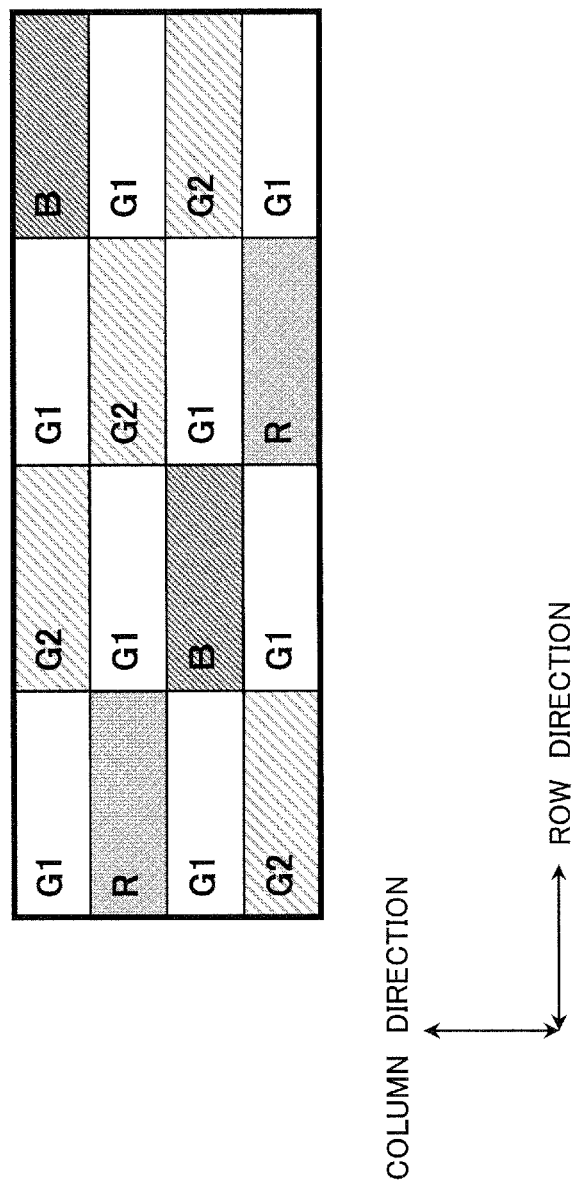
FIG. 6 is a plan view showing an arrangement of color filters (1) according to another embodiment.
Figure 7:
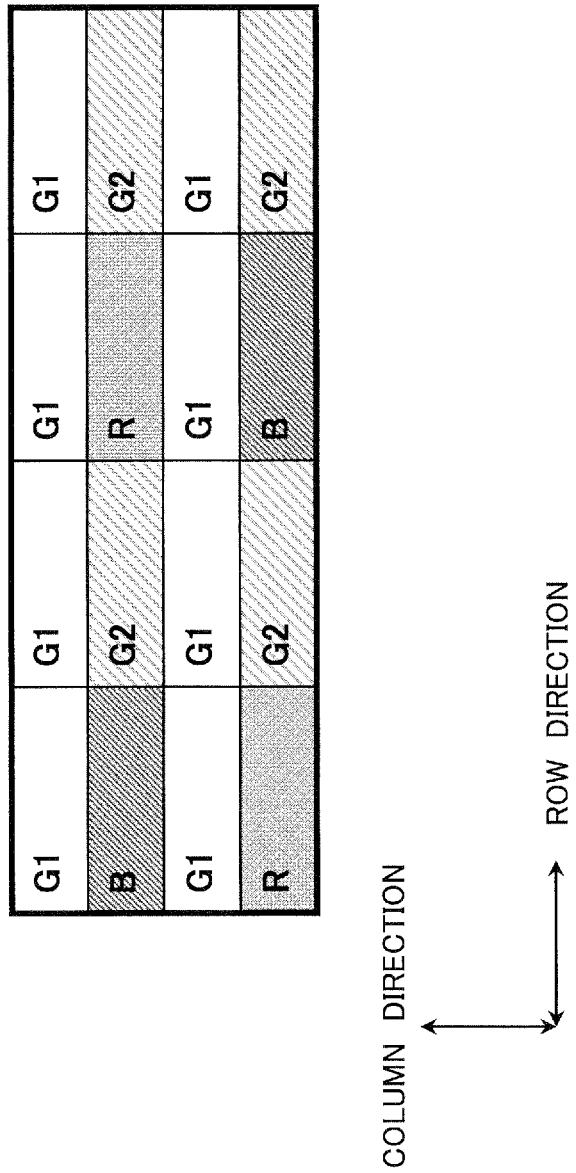
FIG. 7 is a plan view showing an arrangement of color filters (2) according to another embodiment.
Figure 8:
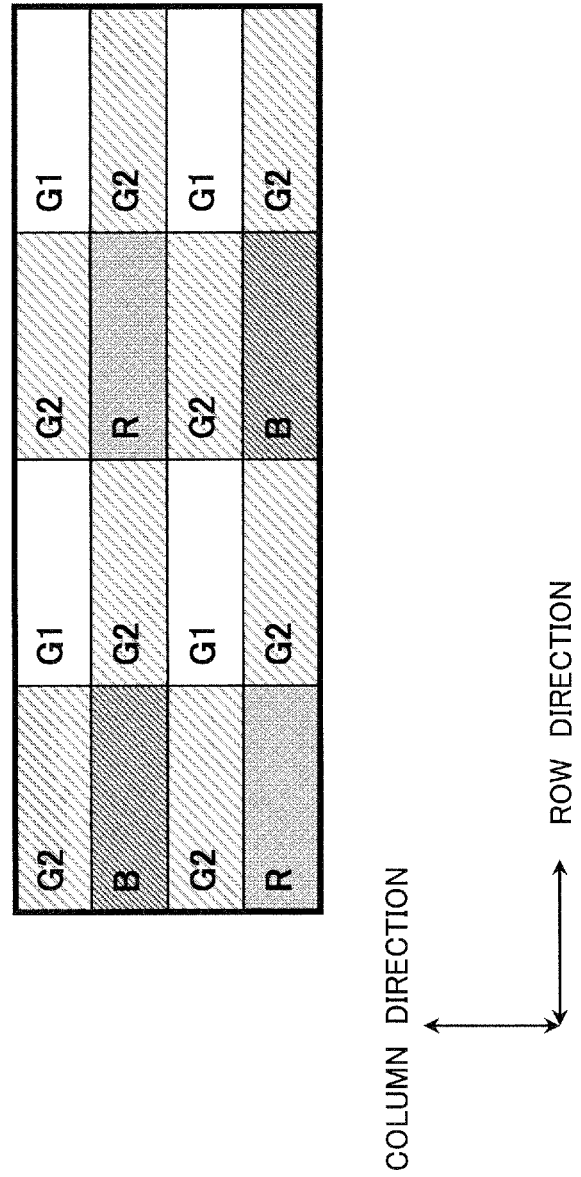
FIG. 8 is a plan view showing an arrangement of color filters (3) according to another embodiment.
Figure 9:
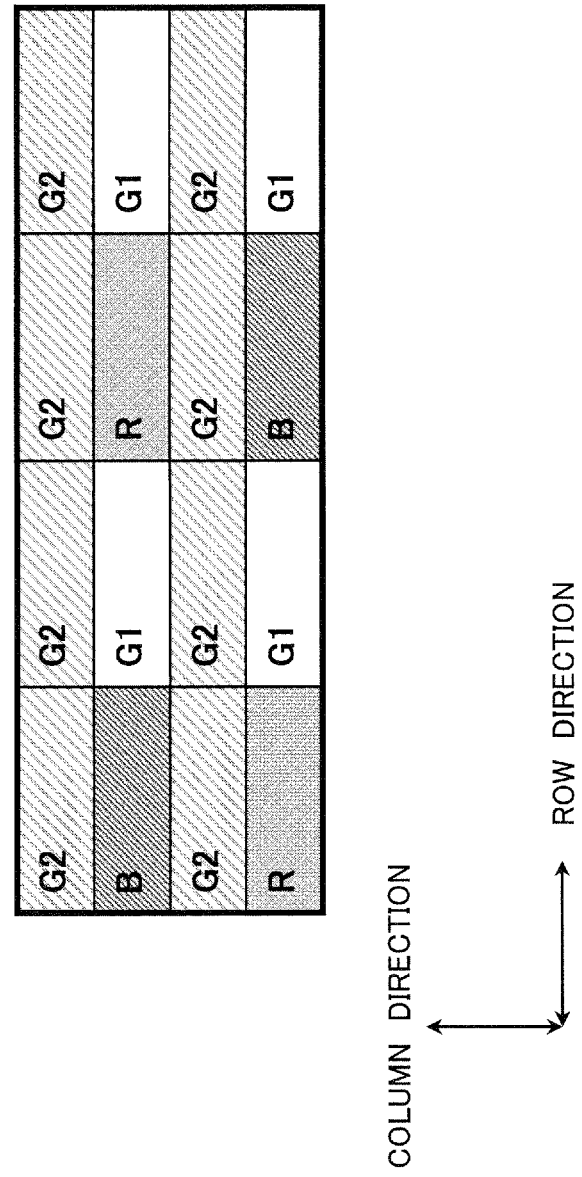
FIG. 9 is a plan view showing an arrangement of color filters (4) according to another embodiment.
Figure 10:
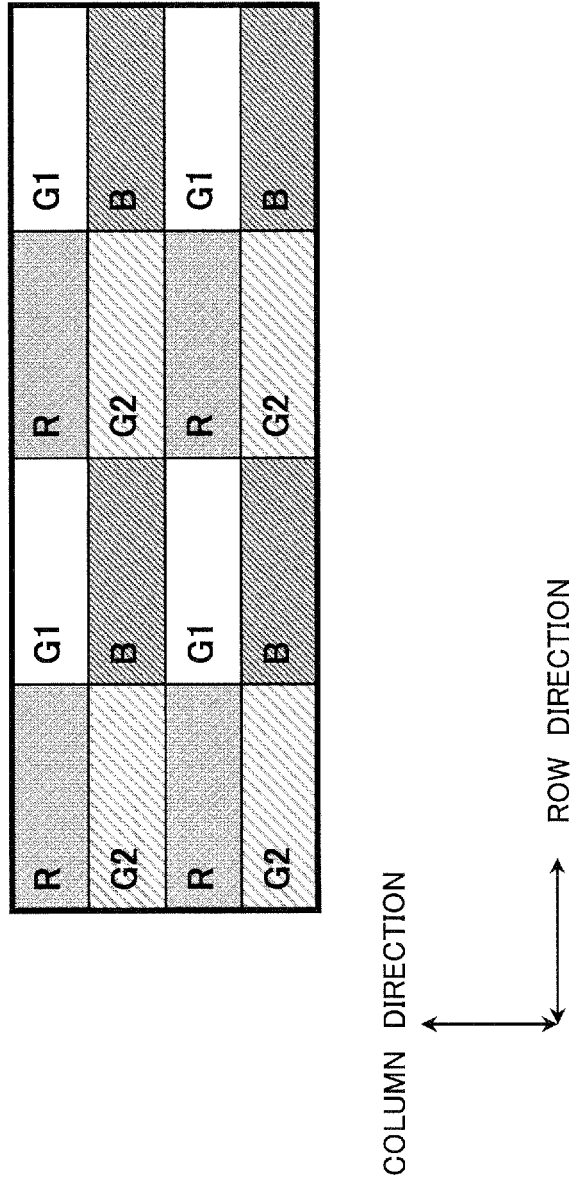
FIG. 10 is a plan view showing an arrangement of color filters (5) according to another embodiment.

Next, a description will be given on an operation for generating a brightness signal (Y) from the image captured by the CMOS image sensor 140 in the digital video camera 100 according to the first embodiment, with reference to FIGS. 4 and 5. FIG. 4 is a flowchart showing an operation performed when the brightness signal (Y) is generated from the captured image. FIG. 5 is a schematic view showing a relationship of coefficients K1 and K2 to generate the brightness signal.

Here, especially, a description will be given, by way of example, on an operation processed when the brightness signal (Y) is generated under a condition that the illuminance of the object (the brightness of the image) is lower than a certain level and the diaphragm unit 300 is in an open state (state in the dark place). The description will be given with the flowchart in FIG. 4.

(Step S100)

First, when the digital video camera 100 is set to a shooting mode by the user, an operation for capturing an image of RAW data (data before development) is started by the CMOS image sensor 140.

(Step 110)

After the start of capturing the RAW data, the controller 180 determines an AGC (Automatic Gain Control) gain, based on brightness information of the captured RAW data. It is noted that AGC gain is determined depending on the illuminance of the subject in the image, the value of the AGC gain becomes higher as the illuminance of the subject becomes lower.

(Step S120)

After determining the AGC gain, the controller 180 calculates the coefficients K1 and K2 based on the determined AGC gain. Here, the coefficients K1 and K2 are coefficients by which the RAW data G1 and G2 of the green color filters are multiplied for weighting, as correction, as shown in the following equation (1) to calculate a green color correction signal G'. More specifically, in this example, the controller 180 calculates the coefficients K1 and K2, according to the relationship with the AGC gain shown in FIG. 5.

$$G' = K1 \times G1 + K2 \times G2 \quad (1)$$

As shown in FIG. 5, the coefficient K2 is set so that its value increases as the AGC gain increases (in the dark place where the illuminance of the object is low). Meanwhile, the coefficient K1 is set so that its value increases as the AGC gain decreases (in the bright place where the illuminance of the object is high).

Therefore, according to this example, when the illuminance of the object is low (state in the dark place), the value of the coefficient K2 is greater than the value of the coefficient K1. Therefore, when the illuminance of the object is high (state in the bright place), the correction is made such that the weighting of the RAW data G2 of the green color filter on a short wavelength side is relatively greater than the weighting of the RAW data G1 of the green color filter on a long wavelength side. Thus, as will be described later, the digital video camera 100 can generate an image which reproduces green color likely to be recognized in the dark place by the human eye.

In addition, as shown in FIG. 5, according to the first embodiment, the values of the coefficients K1 and K2 are set to linearly change according to the value of the AGC gain. Thus, the kind of green color does not rapidly change, and therefore the image which does not leave a feeling of strangeness in the human eye can be generated at the time of switching between the dark place and the bright place.

In this example, the coefficients K1 and K2 are both not less than 0 and not more than 1 ($0 \leq K1 \leq 1$, and $0 \leq K2 \leq 1$). In addition, a sum of the coefficients K1 and K2 is equal to 1 ($K1 + K2 = 1$). These are set in order to ensure color reproducibility and prevent the green color component G from increasing or decreasing.

(Step S130)

Then, the controller 180 calculates a value of the green color composite signal G' with the calculated coefficients K1 and K2. More specifically, as shown in equation (1), the controller 180 calculates the green color composite signal G' according to the illuminance of the subject, by assigning the values of the coefficients K1 and K2 and the RAW data G1 and G2 of the green color filter.

(Step S140)

Then, the controller 180 calculates a low frequency component (YL) of a brightness signal (Y), according to the following equation (2).

$$YL = 0.3 \times RL + 0.59 \times G'L + 0.11 \times BL \quad (2)$$

As shown in equation (2), the low-frequency component (YL) of the brightness signal (Y) is calculated by assigning the value of the low-frequency component RL of the pixel output R of red color filters, the value of the low-frequency component BL of the pixel output B of blue color filters, the value of the low-frequency component G'L of the green color composite signal G' calculated in the step S130. In addition, the low-frequency component G'L of the green color composite signal G' in the equation (2) is calculated, by using the low-frequency component G1L of the pixel output G1 from green color filters (G1) arranged in a checkerboard pattern, and the low-frequency component G2L of the pixel output G2 from color filters (G2) arranged complementarily, and the following equation (3).

$$G'L = K1 \times G1L + K2 \times G2L \quad (3)$$

Meanwhile, the high-frequency component (YH) of the brightness signal (Y), as shown below, is configured using the high-frequency component G1H of the pixel output 31 from green color filters (G1) arranged in a checkerboard pattern, and the high-frequency component G2H of the pixel output 32 from color filters (G2) arranged complementarily.

$$YH = G1H + G2H \quad (4)$$

(Step S150)

Then, the controller 180 generates a wideband brightness signal (Y) by adding the high-frequency component YH and the low-frequency component YL of the luminance signal as shown in the following equation (5).

$$Y = YL + YR \quad (5)$$

Here, in the dark place in this example, the weighting (K2) of the RAW data G2 of the green color filter having a peak of sensitivity on short wavelength side, is relatively large compared with the weighting (K1) of the RAW data G1 of the green color filter having a peak of sensitivity in long wavelength side, and the green color composite signal G' is generated according to the illuminance of the subject (S130). Therefore, the brightness signal YL is calculated according to the low-frequency signal G'L of the correction signal G' generated by the weighted RAW data G1 and G2 as described above (step 140). As a result, the wideband brightness signal (Y) is generated corresponding to correction signal G' to be suitable for the dark place.

On the other hand, in the state where the illuminance of the object is higher than a certain level and the diaphragm unit 300 is near to close (state of the bright place), the relationship between the coefficients K1 and K2 is opposite to the state of the dark place. That is, as shown in FIG. 5, in the bright state, the weighting coefficient K1 of the RAW data G1 of the green color filter having a peak of sensitivity in long wavelength side is set to be relatively large compared with the weighting coefficient K2 of the RAW data G2 of the green color filter having a peak of sensitivity in short wavelength side.

2-4. Function and Effect

According to the first embodiment, at least the following effects are provided.

That is, by changing the configuration which is mainly composed of G' which is the main component in the brightness signal according to the level of illuminance of the subject, the brightness signal can be reproduced easily which is suitable for characteristic of spectral luminous efficiency of a human eye.

The controller 180 provided in the imaging apparatus 100 corrects the image signal generated through the two kinds of first and second green color filters (G1 and G2) with different spectral sensitivity with the predetermined coefficients (K1 and K2), according to the illuminance level of the object, and controls the generation of the brightness signal (Y).

More specifically, the controller 180 in this example calculates the coefficients K1 and K2 according to the relationship with the AGC gain (illuminance) shown in FIG. 5. As shown in FIG. 5, the coefficient K2 is set so that its value increases as the AGC gain increases (as the illuminance of the subject decreases in the dark place). Meanwhile, the coefficient K1 is set so that its value increases as the AGC gain decreases (as the illuminance of the subject increases in the bright place) (step S120).

Therefore, according to equation (1), for an image with low illuminance (state in the dark place), the green color correction signal G' is calculated so that the weighting coefficient K2 of the RAW data G2 the green color filter on the short wavelength side is relatively greater than the weighting coefficient K1 of the RAW data G1 of the green color filter on the long wavelength side (step S130).

The calculated green color correction signal G' is used for calculating the low frequency component (YL) of the brightness signal, according to equation (2). That is, a contribution ratio on the lower frequency side is improved in calculating the low frequency component (YL) of the brightness signal (step S140).

Thus, the brightness signal (Y) is generated by adding the low frequency component (YL) of the brightness signal and the high frequency component (YH) of the brightness signal (step S150).

As described above, in the present embodiment, as shown in FIG. 5, in the state the illuminance of the subject is low (in the state the AGC gain is high), the coefficient K2 for RAW data G2 from the green filter having a peak of sensitivity on short wavelength side is set larger. In other words, in generating the composite green signal G', as the illuminance of the subject is low, the weighting of the image data G2 from the green color filter having a peak of sensitivity on short wavelength side is set greater. Thus, an image can be generated, which reproduces the green easily visible to the human eye in the dark place. This is based on the visual feature that recognizes the object by working the rod cell which mainly recognizes the light (G2) having the wavelength of the neighborhood of 500 nm on the short wavelength side, in the dark place.

In addition, the values of the coefficients K1 and K2 are set to linearly change according to the value of the AGC gain. Thus, the kind of green color does not rapidly change, so that the image which does not provide the feeling of strangeness in the human eye can be generated at the time of switching between the dark place and the bright place.

In this example, the coefficients K1 and K2 are both not less than 0 and not more than 1 (0≤K1≤1, and 0≤K2≤1). In addition, the sum of the coefficients K1 and K2 is equal to 1 (K1+K2=1). These are set in order to ensure the color reproducibility and prevent the green color component G from increasing or decreasing.

2. Other Embodiments

The first embodiment has been described as one example of the embodiment. However, the embodiment is not limited to the above. Other embodiments will be described below.

According to the first embodiment, the CMOS image sensor 140 has been described as one example of the imaging unit, but the imaging unit is not limited thereto. For example, a CCD image sensor or an NMOS image sensor may be used as the imaging unit.

In addition, the image processor 160 and the controller 180 may be configured by one semiconductor chip, or separate semiconductor chips.

In addition, according to the first embodiment, as shown in FIG. 5, the coefficients K1 and K2 are set to linearly change according to the AGC gain. However, the present embodiment is not limited to this configuration. As another configuration, for example, the correction signal G' may be generated by selectively using either one of the green color RAW data G1 or G2 according to the predetermined AGC gain. Thus, the image likely to be recognized by the human eye even in the dark place can be generated with a simple configuration.

In addition, according to the first embodiment, the spectral sensitivity of the green color filters (G1 and G2) has the same shape. However, the present embodiment is not always limited to this example. For example, the spectral sensitivity of the green color filter G2 spreads toward the bottom more widely than the spectral sensitivity of the green color filter G1. Thus, an image having higher sensitivity in the dark place can be generated.

In addition, according to the first embodiment, the brightness signal (Y) is calculated from the sum of the low frequency component (YL) of the brightness signal and the high frequency component (YH) of the brightness signal. However, the present embodiment is not always limited to this example. For example, a ratio of the high frequency component (YH) of the brightness signal in the following equation (6) may be reduced as the AGC gain increases (that is, as the illuminance of the object reduces). Thus, an S/N ratio of the captured image can be improved.

$$Y=YL+\alpha \times YH \tag{6}$$

In addition, according to the first embodiment, the coefficients K1 and K2 are determined based on the AGC gain. However, the present embodiment is not always limited to this example. For example, the coefficients K1 and K2 may be determined based on a color temperature of the captured image.

Furthermore, according to the first embodiment, the low frequency component (YL) of the brightness signal is calculated with equation (2). However, the present embodiment is not always limited to this configuration. For example, the following equation (7) may be used for the calculation.

$$YL=0.25 \times RL+0.5 \times G'L+0.25 \times BL \tag{7}$$

In addition, according to the first embodiment, the color filters are arranged as shown in FIG. 3. However, it is not always necessary to take this configuration. For example, the color filters (1) to (5) may be arranged as shown in FIGS. 6 to 10. That is, any arrangement can be employed as long as the imaging element 140 has the two kinds of first and second green color filters (G1 and G2).

As described above, the embodiments are described as examples of the art in the present disclosure. The detailed description and accompanying drawings are provided for the purpose. Accordingly, the configurations that are described in the detailed description and accompanying drawings may include not only the essential configurations but also those for illustrating the art described above, which are not essential to solve the problem. Consequently, these configurations which are not essential should not be construed as essential matters immediately, even though they are described in the detailed description and accompanying drawings. In the embodiments described above, various modifications, replacements, additions, and omissions will be made within the scope of the appended claims or their ecuivalents, because the embodiments are intended to illustrate the art in the present disclosure.

INDUSTRIAL APPLICABILITY

The present disclosure can be applied to an imaging element and an imaging apparatus having an imaging element that generates image data based on an incident light passing through a color filter.

What is claimed is:

1. An imaging apparatus comprising:
an image sensor that generates an image signal based on an incident light, the image sensor including a red color filter, a blue color filter, a first green color filter, and a second green color filter, the first green color filter having a peak spectral sensitivity in a longer wavelength region than a wavelength of a peak spectral sensitivity of the second green color filter; and
a controller that corrects, according to an illuminance level of a subject, an image signal, that is generated by the image sensor through the first green color filter and the second green color filter, to generate a brightness signal, correcting the image signal with a first coefficient applied to the first green color filter and a second coefficient applied to the second green color filter, wherein
the first coefficient applied to the first green color filter has a value decreasing as the illuminance level of the subject becomes low, and
the second coefficient applied to the second green color filter has a value increasing as the illuminance level of the subject becomes low.

2. The imaging apparatus according to claim 1, wherein
a wavelength of a first peak of the spectral sensitivity of the first green color filter is determined based on a characteristic of spectral luminous efficiency of a human eye in a bright place, and
a wavelength of a second peak of the spectral sensitivity of the second green color filter is determined based on a characteristic of spectral luminous efficiency of the human eye in a dark place.

3. The imaging apparatus according to claim 2, wherein the first peak is provided in a neighborhood of 550 nm, and the second peak is provided in a neighborhood of 500 nm.

4. The imaging apparatus according to claim 1, wherein the first and second coefficients linearly change according to the illuminance level of the subject.

5. The imaging apparatus according to claim 1, wherein the first and second coefficients are both not less than 0 and not more than 1, and a sum of the first and second coefficients is equal to 1.

6. The imaging apparatus according to claim 1, wherein the controller corrects a low frequency component of the generated image signal according to the illuminance level of the subject to generate a brightness signal.

* * * * *